US007936665B2

(12) United States Patent
Ishii

(10) Patent No.: US 7,936,665 B2
(45) Date of Patent: May 3, 2011

(54) IMS NETWORK SYSTEM AND DATA RESTORING METHOD

(75) Inventor: Tamaki Ishii, Minato-ku (JP)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 12/376,705

(22) PCT Filed: Mar. 27, 2008

(86) PCT No.: PCT/JP2008/056624
§ 371 (c)(1),
(2), (4) Date: Feb. 6, 2009

(87) PCT Pub. No.: WO2008/123562
PCT Pub. Date: Oct. 16, 2008

(65) Prior Publication Data
US 2010/0177767 A1    Jul. 15, 2010

(30) Foreign Application Priority Data
Apr. 2, 2007    (JP) .................... 2007-096810

(51) Int. Cl.
*H04L 12/66* (2006.01)
(52) U.S. Cl. ........................ 370/216; 370/356
(58) Field of Classification Search .............. None
See application file for complete search history.

(56) References Cited

U.S. PATENT DOCUMENTS
2009/0210743 A1* 8/2009 Gu et al. ................. 714/15
2009/0279425 A1* 11/2009 Du et al. ................. 370/216
2010/0257272 A1* 10/2010 Belinchon Vergara et al. ................. 709/227

FOREIGN PATENT DOCUMENTS
| JP | 2002-84558 A | 3/2002 |
|---|---|---|
| JP | 2005-64646 A | 3/2005 |
| JP | 2006-109478 A | 4/2006 |
| JP | 2006-517064 A | 7/2006 |
| RU | 2286018 C2 | 10/2006 |
| WO | 2004084510 A1 | 9/2004 |
| WO | 2005039108 A2 | 4/2005 |
| WO | 2005064978 A1 | 7/2005 |

OTHER PUBLICATIONS

Non-Patent Document 1: "Series: IMS Becoming Core of NGN", WBB Forum, Aug. 17, 2007, http://wbb.forum.impressre.jp/serial/list/78.

* cited by examiner

*Primary Examiner* — Kwang B Yao
*Assistant Examiner* — Alex Skripnikov
(74) *Attorney, Agent, or Firm* — Sughrue Mion, PLLC

(57) ABSTRACT

A subscriber data restoring type IMS (IP Multimedia subsystem) network system includes a P-CSCF (Proxy Call Session Control Function) connected to a SIP (Session Initiation Protocol) terminal as a subscriber terminal via an access network; a S-CSCF (Serving Call Session Control Function) located within a service provision area of a provider to which the SIP terminal subscribes; and a HSS (Home Subscriber Server) storing user subscription information. The S-CSCF transmits a SIP RESET signal to the P-CSCF neighboring thereto when losing subscriber data acquired by registration processing; receives a SIP REGISTER signal transmitted by the P-CSCF in response to the SIP RESET signal; and performs re-registration processing according to the received SIP REGISTER signal to restore the lost subscriber data from the HSS.

20 Claims, 10 Drawing Sheets

IMS NETWORK SYSTEM AND DATA RESTORING METHOD

TECHNICAL FIELD

The present invention relates to an IMS (IP Multimedia subsystem) network system, and particularly to an IMS network system characterized by its method of restoring subscriber data when a SIP (Session Initiation Protocol) server having subscriber data for performing service control has lost the subscriber data due to a reason such as node restart.

BACKGROUND ART

Studies have been made to build and standardize IMS (IP Multimedia subsystem) networks by 3GPP (3rd Generation Partnership Project) for the purpose of flexibly providing voice, video and other multimedia applications on packet communication networks based on IP (Internet Protocol) technologies, and various technologies related thereto are described in Patent Documents 1 to 3, and Non-Patent Document 1, for example.

FIG. 9 is a conceptual diagram showing IMS network configuration. A SIP (Session Initiation Protocol) terminal (1) is a subscriber terminal in the IMS network. A P-CSCF (2) is a SIP server with a proxy call session control function for direct access from the SIP terminal (1). A S-CSCF (3) is a SIP server called S-CSCF (Serving CSCF) which is located within a service provision area of a provider to which the SIP terminal (1) directly subscribes. An AS (4) is an application server which controls a common enabler connected to the S-CSCF (3) to be shared by various services or controls each of the services. An HSS (5) is a home subscriber server storing user subscription information.

The location of the SIP terminal (1) is registered by performing registration procedures (user registration procedures) through a Gm-I/F using a SIP protocol, whereby the SIP terminal (1) is enabled to enjoy IMS services including transmission/reception services through the IMS network, using VoIP (Voice over Internet Protocol).

Upon receiving a SIP REGISTER signal from the SIP terminal (1), the P-CSCF (2) acquires information on the S-CSCF (3) providing the IMS service, from the HSS (5) serving as the subscriber database through Dx-I/F using Diameter protocol, and transmits the SIP REGISTER signal to the S-CSCF (3) through Mw-I/F using the SIP protocol. Further, upon completion of the registration procedures, the P-CSCF (2) holds registration information such as the IP address of the SIP terminal (1) and the IP address of the S-CSCF (3) to perform relay control of SIP signals in the subsequent IMS services Upon receiving the SIP REGISTER signal from the P-CSCF (2), the S-CSCF (3) acquires subscriber data from the HSS (5) through Cx-I/F using Diameter protocol and holds the same, so that the subsequent transmission/reception services are performed according to the subscriber data. Further, the S-CSCF (3) transmits the SIP REGISTER signal to the AS (4) through ISC-I/F using the SIP protocol, according to iFC (initial Filter Criteria) information contained in the subscriber data from the HSS (5). Upon completion of the registration procedures, the S-CSCF (3) holds registration information such as the IP address of the P-CSCF (2) to thereby enable routing to the P-CSCF (2) during a reception service.

Upon receiving the SIP REGISTER signal from the S-CSCF (3), the AS (4) acquires subscriber data from the HSS (5) through Sh-I/F using Diameter protocol and holds the same, so that the subsequent transmission/reception services are performed according to the subscriber data. The HSS (5) is a subscriber database for managing service data of all the subscribers, and transmits the subscriber data in response to a request from the S-CSCF (3) or the AS (4). Further, the HSS (5) notifies the P-CSCF (2) of the S-CSCF (3) performing the registration control in the registration procedures, and holds the address of the S-CSCF (3) of which the notification was made.

As described above, the IMS network downloads, from the subscriber database HSS (5), subscriber data required by the S-CSCF (3) or AS (4) to perform transmission/reception service according to the SIP REGISTER signal from the SIP terminal (1), and provides a service according to the subscriber data upon receiving a request for services including transmission and reception from the SIP terminal (1).

Patent Document 1: Japanese Kokai Patent Publication No. 2005-064646
Patent Document 2: Japanese Kokai Patent Publication No. 2006-109478
Patent Document 3: Japanese Kohyo Patent Publication No. 2006-517064
Non-Patent Document 1: "Series: IMS Becoming Core of NGN", WBB Forum

DISCLOSURE OF THE INVENTION

Problems to be Solved by the Invention

In the IMS network according to the related art, the S-CSCF (3) and AS (4) having subscriber data for performing service control are not provided with notification means using SIP protocol or registration control to activate the IMS node when having lost the subscriber data due to a reason such as node restart. Therefore, when the S-CSCF (3) or the AS (4) has lost the subscriber data due to a reason such as node restart, the transmission/reception service cannot be provided until registration control is performed by the user and the subscriber data is rebuilt.

A description will be made on the transmission/reception control to be performed when the S-CSCF (3) has lost the subscriber data due to a reason such as node restart in the IMS network according to the related art, with reference to the signal path diagram shown in FIG. 10.

When a SIP terminal registered in the IMS network transmits a SIP INVITE (session establishment request) signal as a transmission request to a P-CSCF via an access network (S 1001), the P-CSCF transmits, upon receiving the SIP INVITE signal as the transmission request, the SIP INVITE signal as the transmission request to a S-CSCF (Serving CSCF) based on registration (user registration) information held in the P-CSCF (S 1002). Receiving the SIP INVITE signal as the transmission request, the S-CSCF searches for subscriber data of the user originating the transmission request, but recognizes that the subscriber data does not exist since it has been lost (S 1003).

Since there is no subscriber data, the S-CSCF cannot provide the transmission service, and transmits a SIP error signal to the P-CSCF (S 1004). Receiving the SIP error signal in response to the transmission request, the P-CSCF transmits the SIP error signal to the SIP terminal (S 1005). As a result of the processing above, the transmission request from the user is rejected by the IMS network, and hence the transmission service cannot be provided until the subscriber data is rebuilt.

When the S-CSCF receives a reception request using SIP INVITE from an originating station (S 1006), the S-CSCF searches for subscriber data of an addressee user, and recognizes that the subscriber data does not exist since the subscriber data has been lost (S 1003). Since the subscriber data does not exist, the S-CSCF determines that the addressee has not performed the registration procedures, and transmits a SIP error signal to the originating station (S 1007). Accordingly, the provision of the reception service becomes impossible even for a user who has performed the registration procedures and to whom the reception service should be provided.

In view of the problems described above, it is an object of the present invention to provide an IMS network with means for restoring lost subscriber data when a S-CSCF or AS has lost subscriber data due to node restart or the like, without depending on SIP re-registration procedures by a SIP terminal, and rapidly enabling provision of transmission/reception services.

Means for Solving the Problems

A subscriber data restoring type IMS network system according to the present invention comprises a P-CSCF connected to a SIP terminal as a subscriber terminal via an access network; a S-CSCF located within a service provision area of a provider to which the SIP terminal subscribes; and a HSS storing user subscription information, and is characterized in that the S-CSCF has the functions of: transmitting a SIP RESET signal to the P-CSCF neighboring thereto when losing subscriber data acquired by registration processing; receiving a SIP REGISTER signal transmitted by the P-CSCF in response to the SIP RESET signal; and performing re-registration processing according to the received SIP REGISTER signal to restore the lost subscriber data from the HSS.

EFFECTS OF THE INVENTION

According to the present invention, when an IMS node having subscriber data has lost the subscriber data, it is notified to a neighboring node by means of a new SIP RESET signal, whereby the neighboring node is enabled to immediately perform SIP registration procedures to rebuild (restore) the subscriber data. Therefore, even if the IMS node loses the subscriber data, the transmission/reception services can be rapidly provided to the SIP terminal without depending on the SIP registration procedures by the SIP terminal.

BEST MODE FOR CARRYING OUT THE INVENTION

A first embodiment of the present invention will be described based on FIG. 1 and FIG. 2.

Figure 1:
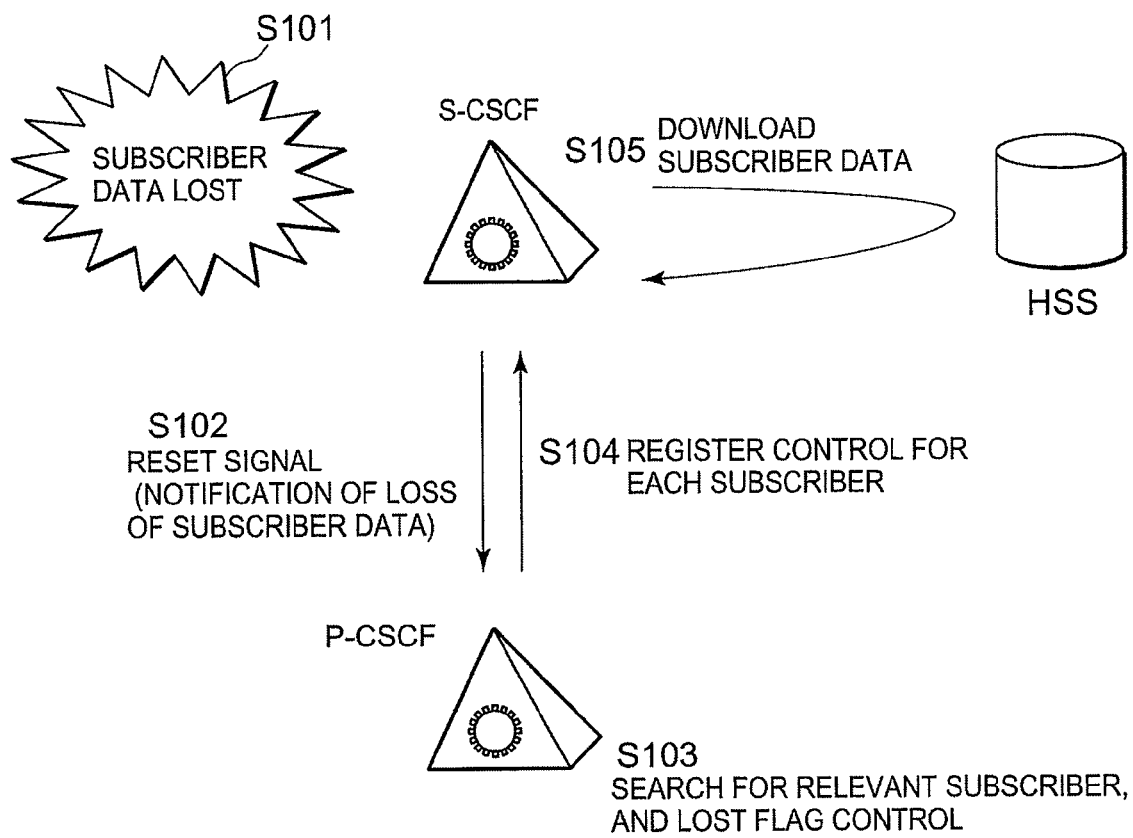
FIG. 1 is a schematic diagram showing a first embodiment of the present invention.

FIG. 1 shows the first embodiment of the present invention, and schematically illustrates data restoring procedures when a S-CSCF has lost subscriber data in an IMS network.

In FIG. 1, when the S-CSCF detects that subscriber data has been lost due to a reason such as node restart (S 101), the S-CSCF transmits a SIP RESET signal to notify a neighboring P-CSCF of the fact that the subscriber data has been lost (S 102). Receiving the SIP RESET signal, the P-CSCF searches for subscribers registered to the S-CSCF which has transmitted the SIP RESET signal and, if any, performs flag control on registration information of the P-CSCF for identifying that the subscriber data is lost in the S-CSCF (S103), while transmitting a SIP REGISTER signal to this S-CSCF (S 104). Receiving the SIP REGISTER signal, the S-CSCF performs registration processing according to existing procedures to rebuild the lost subscriber data from a subscriber database HSS (S 105).

Figure 2:
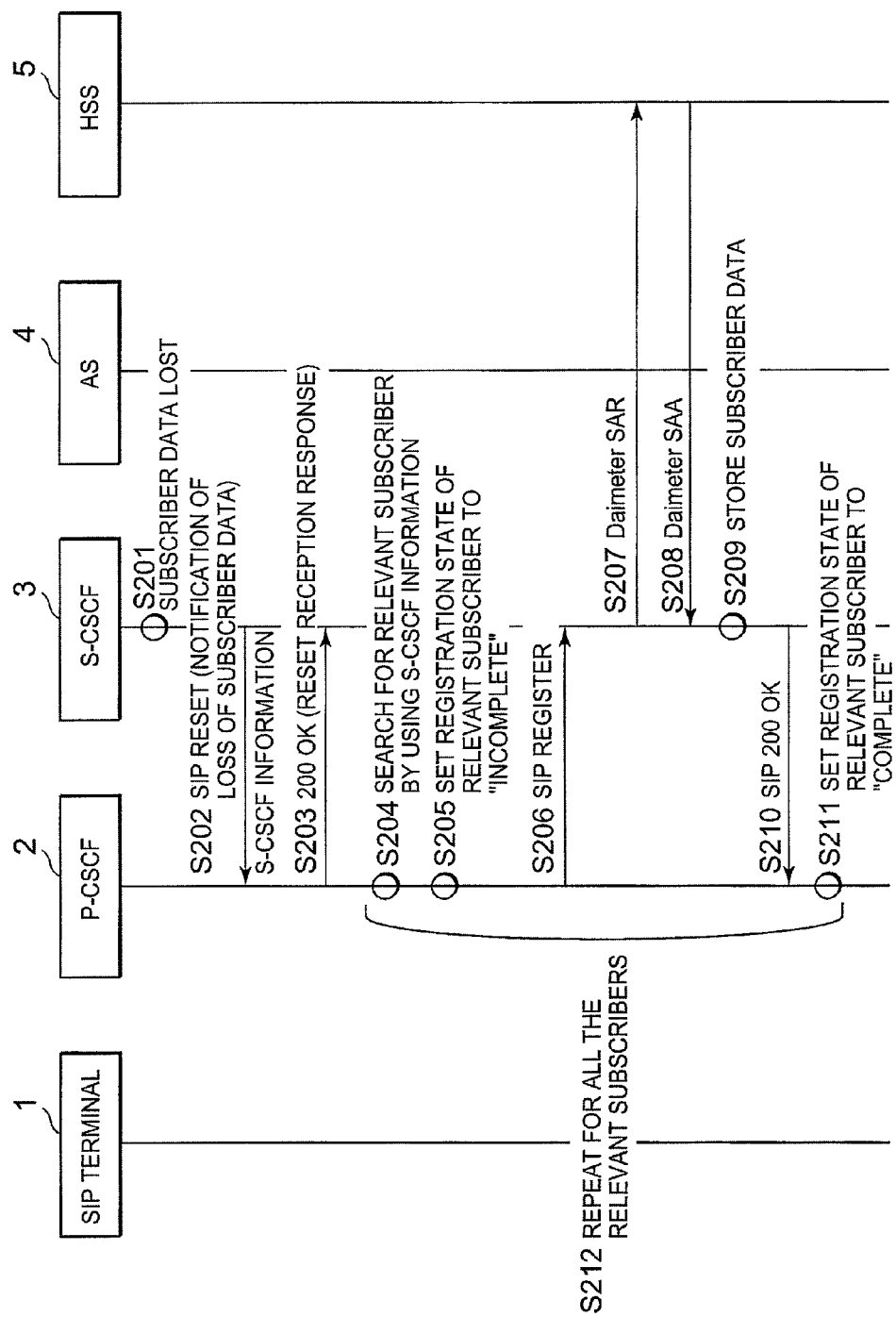
FIG. 2 is an explanatory diagram of procedures for restoring subscriber data when a S-CSCF has lost subscriber data in the first embodiment.

FIG. 2 shows in more detail the procedures for restoring subscriber data when the S-CSCF has lost the subscriber data in the first embodiment. Operation of the first embodiment will be described with reference to FIGS. 1 and 2.

Figure 9:
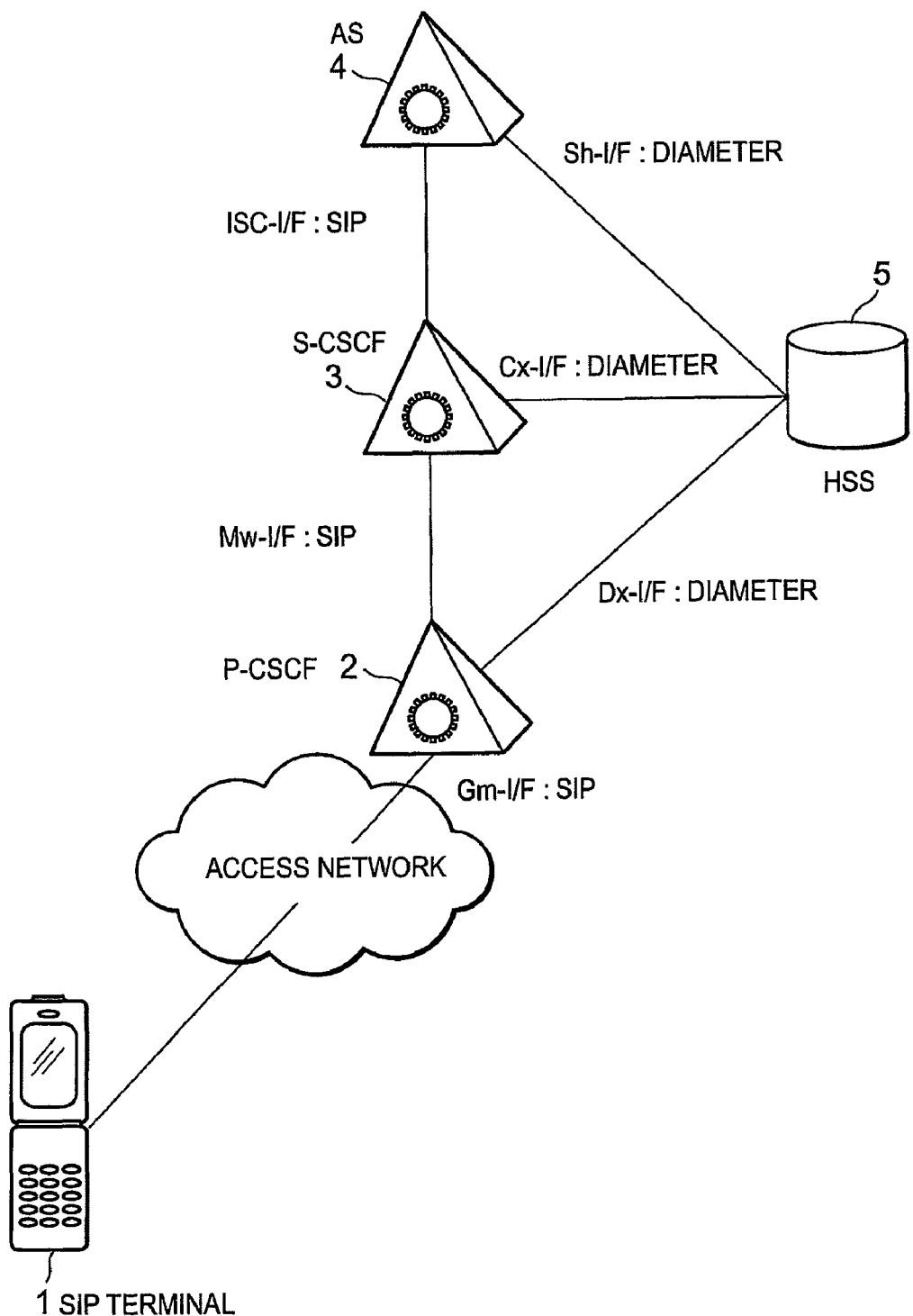
FIG. 9 is a conceptual diagram of IMS network configuration.
Figure 10:
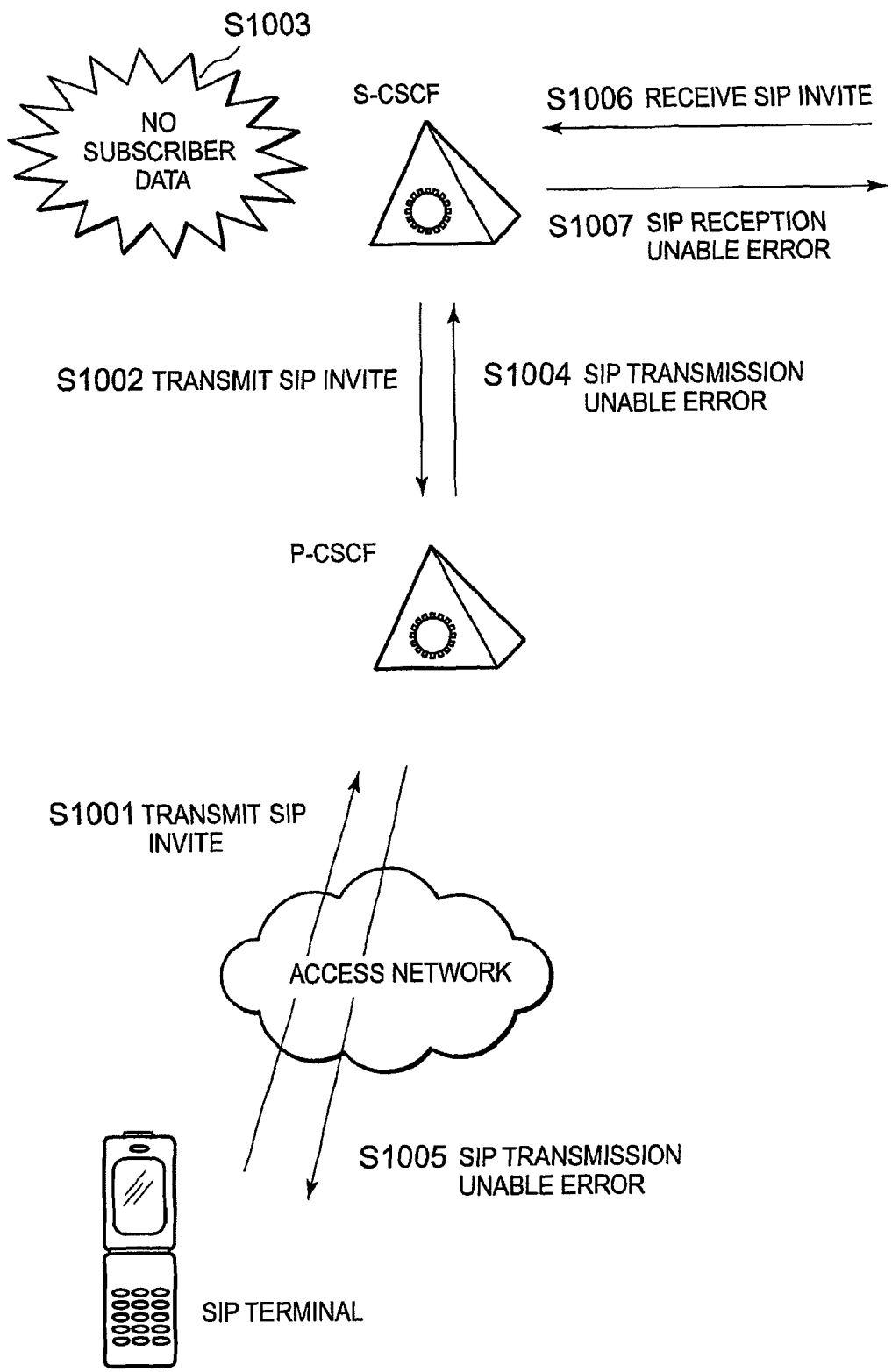
FIG. 10 is a signal path diagram showing transmission/reception control when subscriber data is lost in a related art IMS network.

In FIG. 2, a SIP terminal (1) is a subscriber terminal registered in this IMS network. Registration shown in FIG. 9 is performed according to a SIP REGISTER signal from the SIP terminal (1), and subscriber data required for a S-CSCF (3) or AS (4) to provide transmission/reception services is downloaded from a subscriber database HSS (5), whereby the S-CSCF (3) or AS (4) is ready to provide the service according to the subscriber data upon receiving a service request such as a transmission or reception request from the SIP terminal (1).

When in this state, the S-CSCF (3) detects that subscriber data has been lost due to a reason such as node restart (S 201), the S-CSCF (3) transmits a SIP RESET signal to a neighboring P-CSCF (2) to notify that the subscriber data has been lost (S 202). The SIP RESET signal contains IP address information of the S-CSCF (3) having lost the subscriber data.

Receiving the SIP RESET signal, the P-CSCF (2) transmits a SIP 200 OK signal as a response to the S-CSCF (3) to notify that it has received the SIP RESET signal (S 203). The P-CSCF (2) searches a registration information table in the P-CSCF (2) for subscribers registered in the relevant S-CSCF (3) by using the S-CSCF information set on the SIP RESET signal as a key (S 204).

If the search finds that there exists a subscriber registered to the S-CSCF (3) having lost the subscriber data, processing is performed to set the registration state of the relevant subscriber in the P-CSCF (2) to "INCOMPLETE" (flag setting)

(S 205). After that, the P-CSCF (2) transmits a SIP REGISTER signal to the S-CSCF (3) in order to rebuild the subscriber data lost in the S-CSCF (3) (S 206).

Receiving the SIP REGISTER signal, the S-CSCF (3) downloads subscriber data from the HSS (5) by existing registration procedures indicated in (S 207) to (S 210) to rebuild (restore) the subscriber data, and then transmits a SIP 200 OK signal to the P-CSCF (2) as a response to the SIP REGISTER signal.

Receiving the SIP 200 OK signal from the S-CSCF (3), the P-CSCF (2) recognizes that the lost subscriber data has been rebuilt, and performs processing to change the setting of the registration state of the relevant subscriber to "COMPLETE" (flag clearing) (S 211). The P-CSCF (2) performs search processing until the entire registration information table has been searched through (S 204), and repeats the procedures of (S 204) to (S 211) for all the subscribers registered to the S-CSCF (3) having lost the subscriber data (S 212).

The S-CSCF (3) having lost the subscriber data is enabled, by the procedures described above, to perform registration according to the SIP REGISTER signal started by the P-CSCF (2), and thus to rebuild (restore) the lost subscriber data without the need of receiving a SIP REGISTER signal again from the SIP terminal (1).

A second embodiment of the present invention will be described based on FIGS. 3 and 4.

Figure 3:
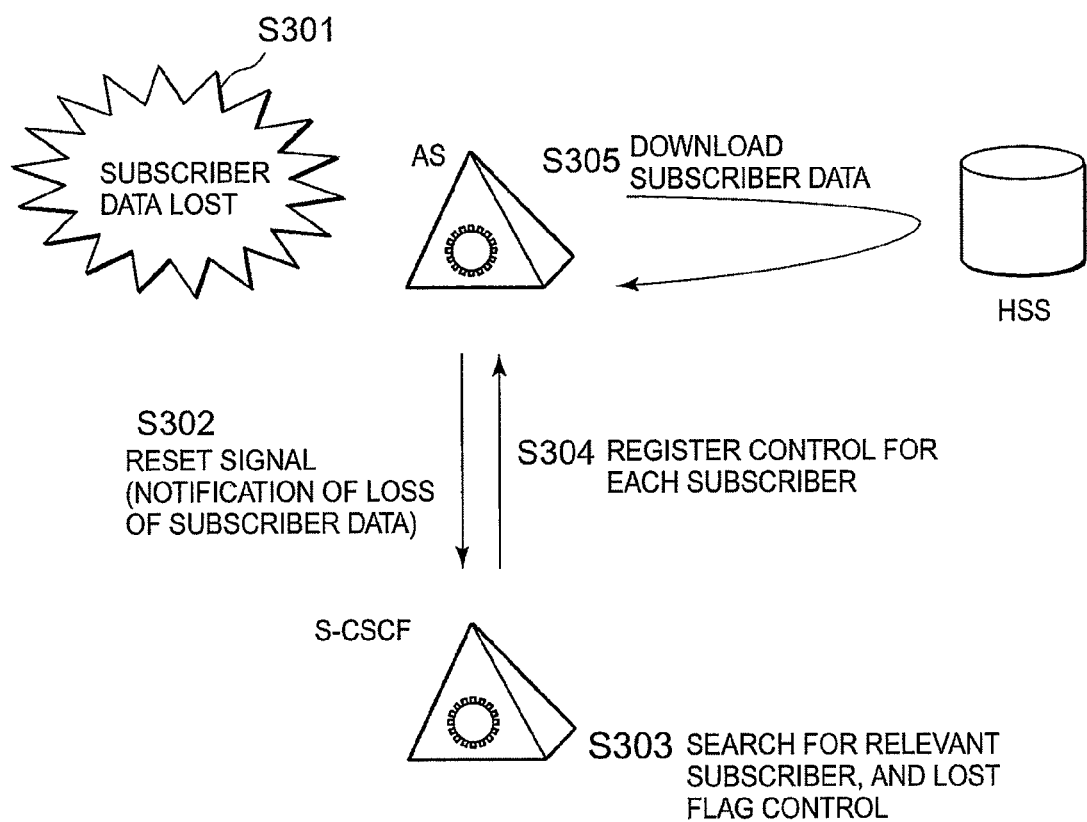
FIG. 3 is a schematic diagram showing a second embodiment of the present invention.

FIG. 3 shows the second embodiment of the present invention, and schematically illustrates data restoring procedures when an AS has lost subscriber data in an IMS network.

In FIG. 3, when the AS detects that subscriber data has been lost due to a reason such as node restart (S 301), the AS transmits a SIP RESET signal to notify a neighboring S-CSCF of the fact that the subscriber data has been lost (S 302). Receiving the SIP RESET signal, the S-CSCF searches for subscribers registered to the AS which has transmitted the SIP RESET signal and, if any, performs flag control on the subscriber data of the S-CSCF to identify that the subscriber data in the AS has been lost (S 303), while transmitting a SIP REGISTER signal to the AS (S 204). Receiving the SIP REGISTER signal, the AS performs registration processing according to existing procedures to thereby rebuild the lost subscriber data from a subscriber database HSS (S 205).

Figure 4:
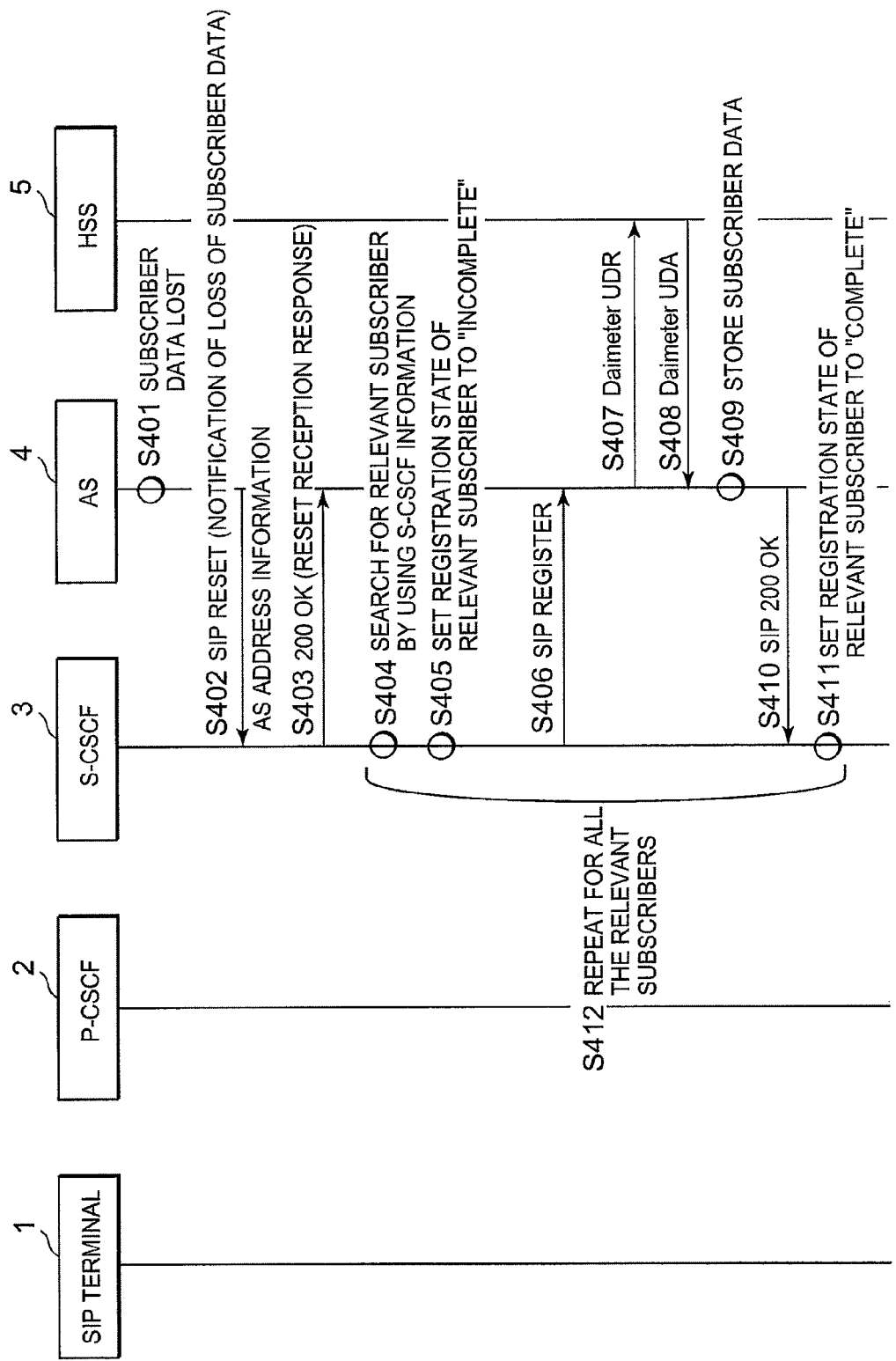
FIG. 4 is an explanatory diagram of procedures for restoring subscriber data when an AS has lost subscriber data in the second embodiment.

FIG. 4 shows in more detail the procedures for restoring subscriber data according to the second embodiment when the AS has lost the subscriber data. Operation of the second embodiment will be described with reference to FIGS. 3 and 4.

When the AS (4) detects that subscriber data acquired by the registration procedures described above has been lost due to a reason such as node restart (S 401), the AS (4) transmits a SIP RESET signal to notify the neighboring S-CSCF (3) of the loss of the subscriber data (S 402). The SIP RESET signal contains IP address information of the AS (4) having lost the subscriber data.

Receiving the SIP RESET signal, the S-CSCF (3) transmits a SIP 200 OK signal as a response to the AS (4) to notify the receipt of the SIP RESET signal (S 403). The S-CSCF (3) searches a registration information table in the S-CSCF (3) for subscribers registered to the relevant AS (4) by using the AS information set on the SIP RESET signal as a key (S 404).

If there exist a subscriber registered to the AS (4) having lost the subscriber data, the S-CSCF (3) performs processing to set the registration state of the relevant subscriber to "INCOMPLETE" in the S-CSCF (3) (flag setting) (S 405). After that, the S-CSCF (3) transmits a SIP REGISTER signal to the AS (4) in order to rebuild the lost subscriber data lost in the AS (4) (S 406).

Receiving the SIP REGISTER signal, the AS (4) downloads the subscriber data from the HSS (5) by existing registration procedures indicated by (S 407) to (S 410) to rebuild (restore) the subscriber data, and then transmits a SIP 200 OK signal to the S-CSCF (3) as a response to the SIP REGISTER signal.

Receiving the SIP 200 OK signal from the AS (4), the S-CSCF (3) recognizes that the lost subscriber data has been rebuilt, and changes the setting of the registration state of the relevant subscriber to "COMPLETE" (flag clearing) (S 411). The S-CSCF (3) performs the search processing until the entire registration information table has been searched through (S 404) and repeats the procedures of (S 404) to (S 411) for all the subscribers registered to the AS (4) having lost the subscriber data (S 412).

By the procedures described above, the AS (4) having lost the subscriber data is enabled to perform registration according to the SIP REGISTER signal started by the P-CSCF (3), and thus to rebuild (restore) the lost subscriber data without the need of receiving a SIP REGISTER signal again from the SIP terminal (1).

In the embodiments above, the P-CSCF or the S-CSCF searches for subscribers requiring SIP registration procedures, upon receiving a SIP RESET signal (new), and immediately transmits a SIP REGISTER signal to rebuild the subscriber data. However, in the case of an IMS network having a large number of subscribers, a high volume of SIP REGISTER signals are exchanged in a short period of time, possibly resulting in temporary increase in the network load.

Considering such problem of network load, the subscriber data restoring procedures may be performed such that the transmission of the SIP REGISTER signal is triggered by transmission/reception by the user. Description will be made of an embodiment in which the subscriber data restoration is performed by being triggered by transmission/reception by the user.

A third embodiment of the present invention will be described with reference to FIG. 5.

Figure 5:
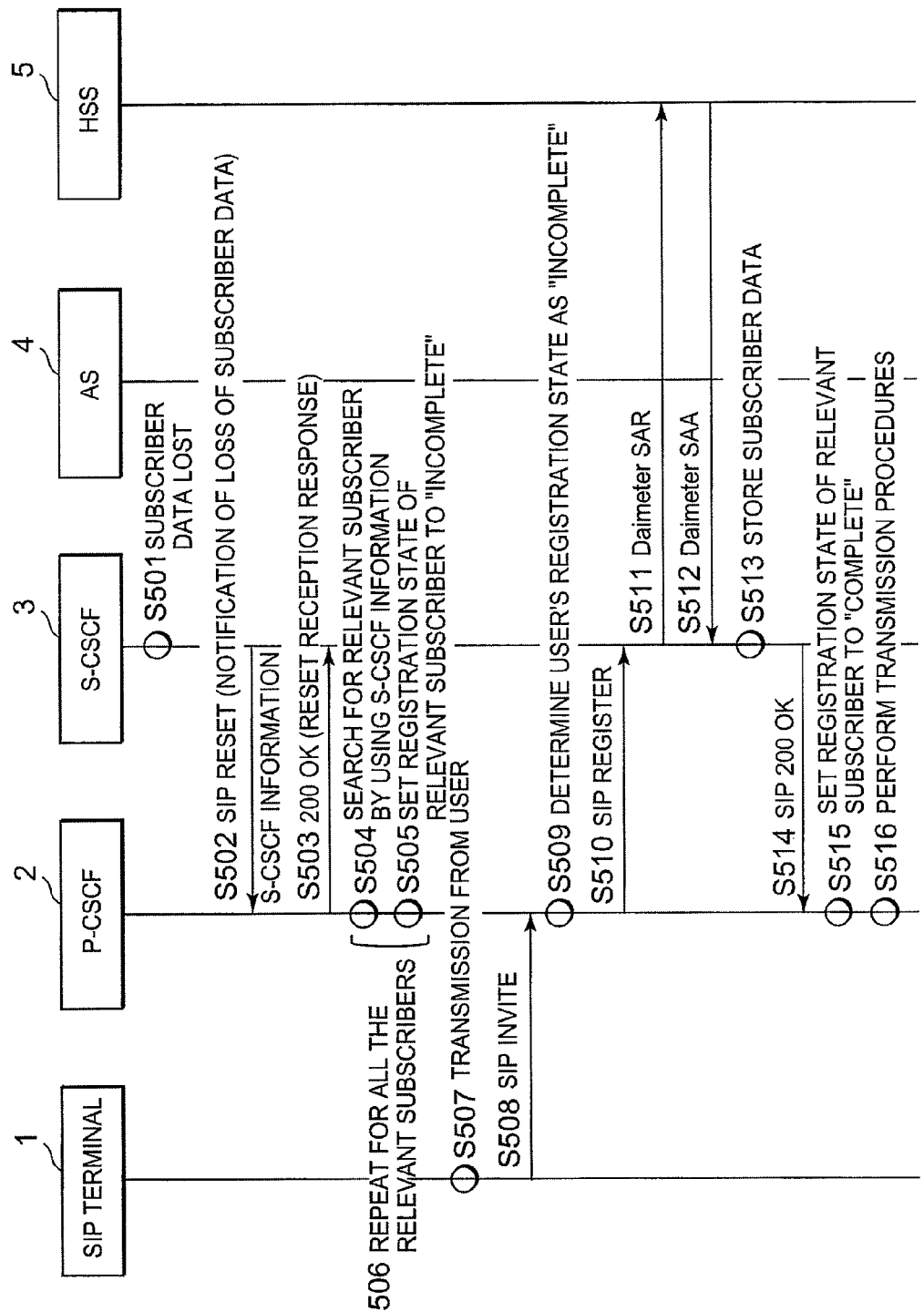
FIG. 5, showing a third embodiment of the present invention, is an explanatory diagram of procedures for restoring subscriber data when a S-CSCF has lost subscriber data, the procedures being triggered by transmission from the user.

FIG. 5, showing the third embodiment of the present invention, is an explanatory diagram of procedures to be performed when the subscriber data restoration is triggered by transmission by the user when the S-CSCF has lost subscriber data. Operation of the third embodiment will be described with reference to FIG. 5.

When the S-CSCF (3) detects that subscriber data has been lost due to a reason such as node restart (S 501), the S-CSCF (3) transmits a SIP RESET signal to a neighboring P-CSCF (2) to notify that the subscriber data has been lost (S 502). The SIP RESET signal contains IP address information of the S-CSCF (3) which has lost the subscriber data.

Receiving the SIP RESET signal, the P-CSCF (2) transmits a SIP 200 OK signal as a response to the S-CSCF (3) to notify the receipt of the SIP RESET signal (S 503). The P-CSCF (2) searches a registration information table in the P-CSCF (2) for subscribers registered to the relevant S-CSCF (3) by using the S-CSCF information set on the SIP RESET signal as a key (S 504).

When there exist a subscriber registered to the S-CSCF (3) having lost the subscriber data, the P-CSCF (2) sets the registration state of the subscriber in the P-CSCF (2) to "INCOMPLETE" (flag setting) (S 505). The search processing is performed until the entire registration information table is searched through (S 504), and the procedures of (S 505) are repeated for all the subscribers registered to the S-CSCF (3) having lost the subscriber data (S 506).

When the user performs a transmission operation (S 507), the SIP terminal (1) issues a transmission request to the P-CSCF (2) by means of a SIP INVITE signal (S 508). Receiving the SIP INVITE signal, the P-CSCF (2) searches a registration information table for the relevant subscriber, determines the registration state set in the steps (S 504) to (S 505), and recognizes that the registration state is "INCOMPLETE" (a flag is set) (S 509).

Recognizing that the registration state is "INCOMPLETE", the P-CSCF (2) transmits a SIP REGISTER signal to the S-CSCF (3) in order to rebuild the lost subscriber data in the S-CSCF (3) (S 510). Receiving the SIP REGISTER signal, the S-CSCF (3) downloads the subscriber data from the HSS (5) by the existing registration procedures indicated in (S 511) to (S 513) to rebuild (restore) the subscriber data, and then transmits a SIP 200 OK signal to the P-CSCF (2) as a response to the SIP REGISTER signal (S 514).

Receiving the SIP 200 OK signal from the S-CSCF (3), the P-CSCF (2) recognizes that the lost subscriber data has been rebuilt, and performs setting to change the registration state of the relevant subscriber to "COMPLETE" (flag clearing) (S 515). When the registration state of the subscriber is changed to "COMPLETE", the P-CSCF (2) performs INVITE transmission processing according to the existing procedures (S 516).

According to this embodiment, configuration is made such that every time the P-CSCF (2) receives a SIP INVITE signal, the S-CSCF (3) restores subscriber data of a SIP terminal which has transmitted the SIP INVITE signal. This prevents a high volume of SIP REGISTER signals from being exchanged in a short period of time, and hence the temporary increase in the network load can be avoided.

A fourth embodiment of the present invention will be described using FIG. 6.

Figure 6:
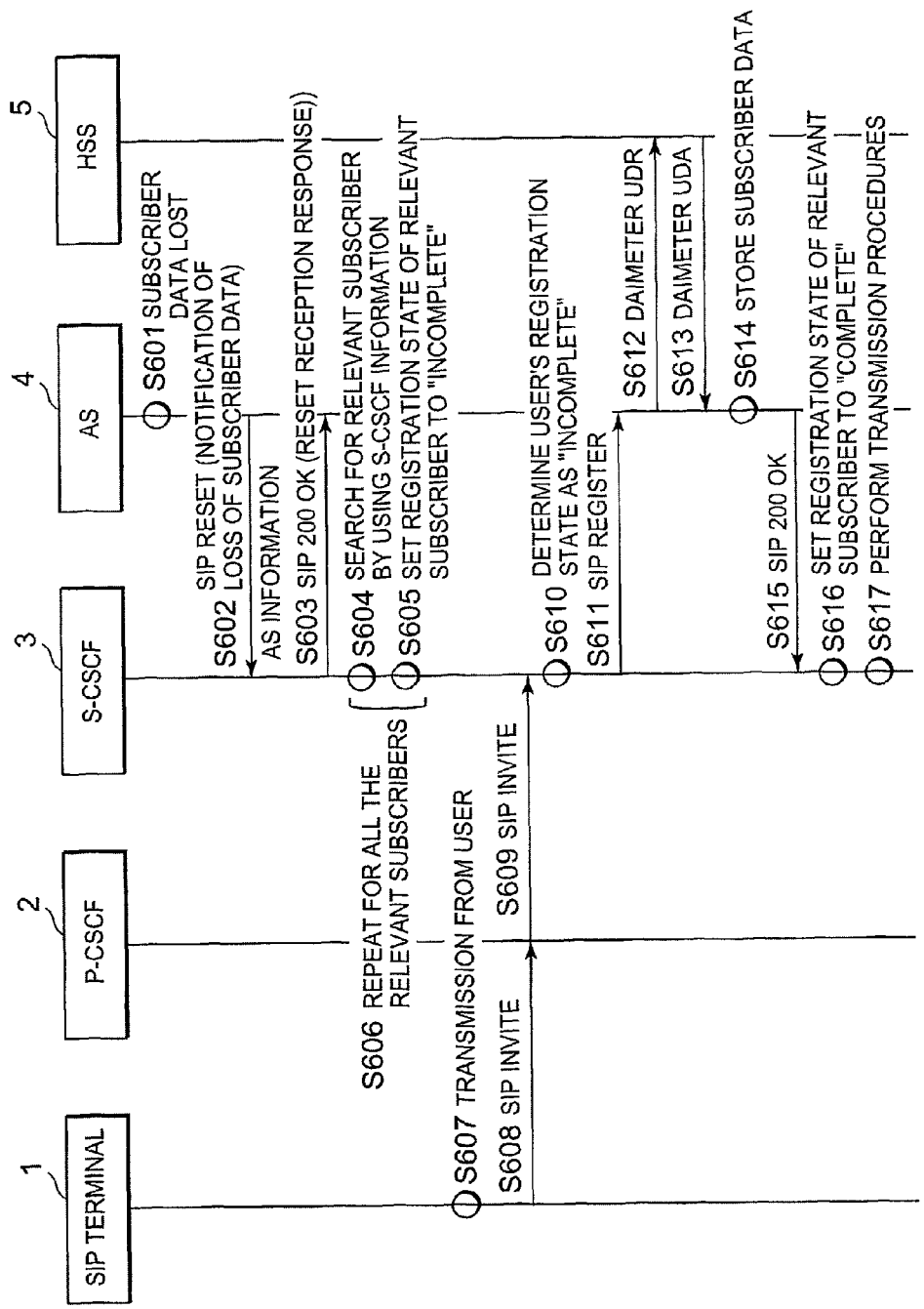
FIG. 6, showing a fourth embodiment of the present invention, is an explanatory diagram of procedures for restoring subscriber data when an AS has lost subscriber data, the procedures being triggered by transmission from the user.

FIG. 6 showing the fourth embodiment of the present invention is an explanatory diagram of procedures to be performed by being triggered by transmission by the user when the AS has lost subscriber data. Operation of the fourth embodiment will be described with reference to FIG. 6.

When the AS (4) detects that subscriber data has been lost due to a reason such as node restart (S 601), the AS (4) transmits a SIP RESET signal to a neighboring S-CSCF (3) to notify that the subscriber data has been lost (S 602). The SIP RESET signal contains IP address information of the AS (4) having lost the subscriber data.

Receiving the SIP RESET signal, the S-CSCF (3) transmits to the AS (4) a SIP 200 OK signal as a response to notify the receipt of the SIP RESET signal (S 603). The S-CSCF (3) searches subscriber data in the S-CSCF (3) for subscribers registered to the relevant AS (4) by using the AS information set on the SIP RESET signal as a key (S 604).

If there exists a subscriber registered to the AS (4) having lost the subscriber data, the S-CSCF (3) performs processing to set the registration state of the relevant subscriber in the S-CSCF (3) to "INCOMPLETE" (flag setting) (S 605). The S-CSCF (3) performs the search processing until the entire subscriber data has been searched through (S 604), and repeats the procedure of (S 605) for all the subscribers registered to the AS (4) having lost the subscriber data (S 606).

When the user performs a transmission operation (S 607), the SIP terminal (1) issues a transmission request to the P-CSCF (2) by means of a SIP INVITE signal (S 608). Receiving the SIP INVITE signal, the P-CSCF (2) transmits the SIP INVITE signal to the S-CSCF (3) according to the address information of the S-CSCF (3) on the SIP INVITE signal (S 609). Receiving the SIP INVITE signal, the S-CSCF (3) searches the subscriber data table for the relevant subscriber, determines the registration state set in the procedures of (604) to (605), and recognizes that the registration state is "INCOMPLETE" (S 610).

Recognizing that the registration state is "INCOMPLETE", the S-CSCF (3) transmits a SIP REGISTER signal to the AS (4) in order to rebuild the lost subscriber data in the AS (4) (S 611). Receiving the SIP REGISTER signal, the AS (4) downloads the subscriber data from the HSS (5) by existing registration procedures indicated in (S 612) to (S 615) to rebuild (restore) the subscriber data, and then transmits a SIP 200 OK signal to the S-CSCF (3) as a response to the SIP REGISTER signal.

Receiving the SIP 200 OK signal from the AS (4), the S-CSCF (3) recognizes that the lost subscriber data has been rebuilt, and performs processing to change the registration state of the relevant subscriber to "COMPLETE" (flag clearing) (S 616). When the registration state of the subscriber is changed to "COMPLETE", the S-CSCF (3) performs INVITE transmission processing according to existing procedures (S 617).

According to the fourth embodiment, configuration is made such that every time the S-CSCF (3) receives a SIP INVITE signal from the P-CSCF (2), the AS (4) restores subscriber data of a SIP terminal which has transmitting the SIP INVITE signal. This prevents a high volume of SIP REGISTER signals from being exchanged in a short period of time, and hence the temporary increase in the network load can be avoided.

A fifth embodiment of the present invention will be described using FIG. 7.

Figure 7:
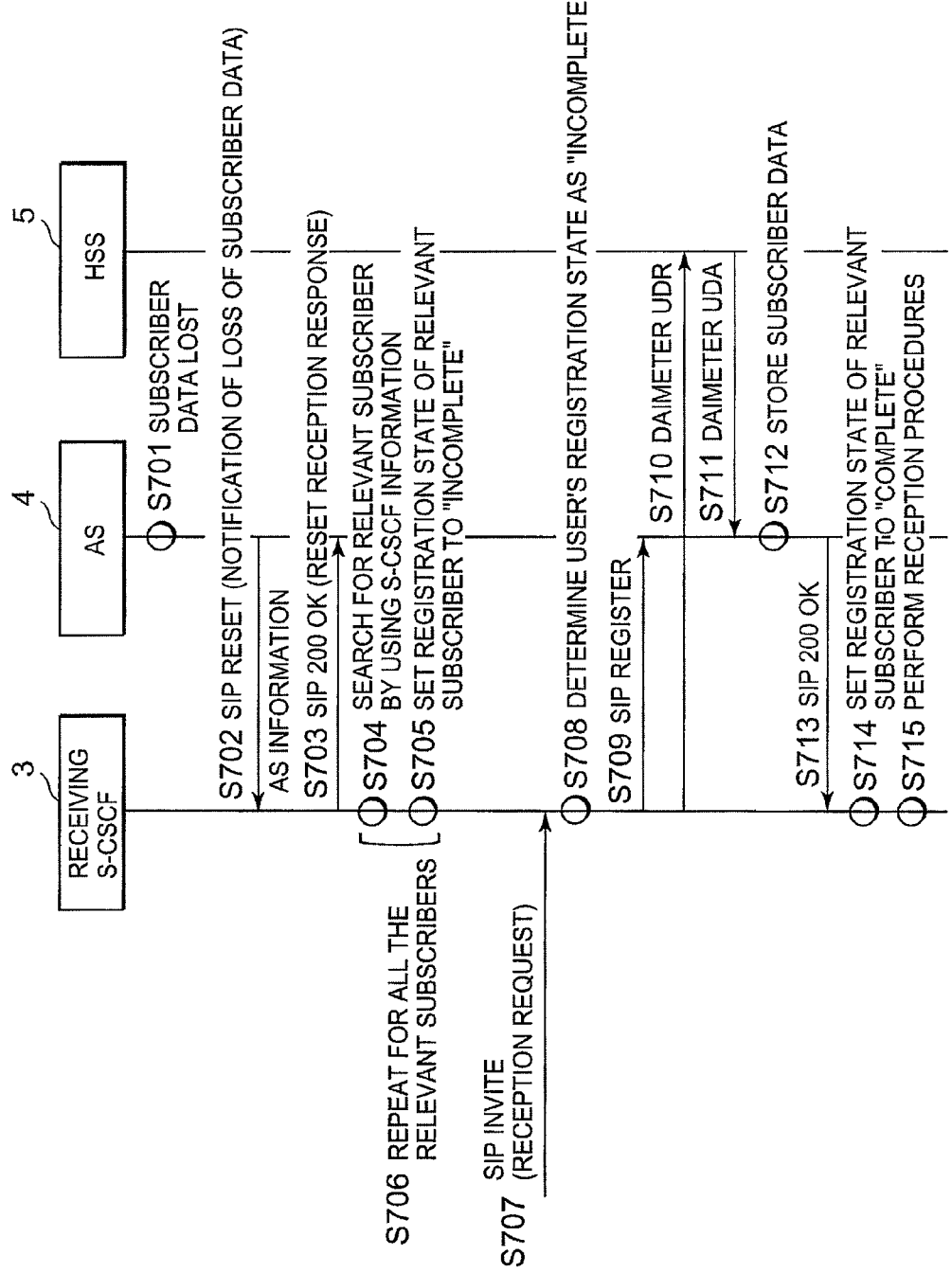
FIG. 7, showing a fifth embodiment of the present invention, is an explanatory diagram of procedures for restoring subscriber data when an AS has lost subscriber data, the procedures being triggered by reception by the user.

FIG. 7 showing the fifth embodiment of the present invention is an explanatory diagram of procedures for restoration of subscriber data to be performed by being triggered by reception by the user when the AS has lost subscriber data. Operation of the fifth embodiment will be described with reference to FIG. 7.

When the AS (4) detects that subscriber data has been lost due to a reason such as node restart (S 701), the AS (4) transmits a SIP RESET signal to a neighboring S-CSCF (3) in order to notify that the subscriber data has been lost (S 702). The SIP RESET signal contains IP address information of the AS (4) having lost the subscriber data.

Receiving the SIP RESET signal, the S-CSCF (3) transmits to the AS (4) a SIP 200 OK signal as a response to notify the receipt of the SIP RESET signal (S 703). Additionally, the S-CSCF (3) searches the subscriber data in the S-CSCF (3) for subscribers registered to the AS (4) by using the AS information set on the SIP RESET signal as a key (S 704).

If there exists a subscriber registered to the AS (4) having lost the subscriber data, the S-CSCF (3) performs processing to set the registration state of the relevant subscriber in the S-CSCF (3) to "INCOMPLETE" (flag setting) (S 705). The S-CSCF (3) performs the search processing until the entire subscriber data has been searched through (S 704), and repeats the procedure of (S 705) for all the subscribers registered to the AS (4) having lost the subscriber data (S 706).

When the S-CSCF (3) receives a SIP INVITE reception request to a subscriber whose subscriber data has been lost by the AS (4) (S 707), the S-CSCF (3) searches the subscriber data table for the relevant subscriber, determines the registration state set in the procedures (S 704) to (S 705), and recognizes that the registration state is "INCOMPLETE" (S 708).

Recognizing that the registration state is "INCOMPLETE", the S-CSCF (3) transmits a SIP REGISTER signal to the AS (4) in order to rebuild the lost subscriber data in the AS (4) (S 709). Receiving the SIP REGISTER signal, the AS (4) downloads the subscriber data from the HSS (5) according to existing registration procedures indicated in (S 710) to (S 713) to rebuild (restore) the subscriber data, and then transmits a SIP 200 OK signal to the S-CSCF (3) as a response to the SIP REGISTER signal.

Receiving the SIP 200 OK signal from the AS (4), the S-CSCF (3) recognizes that the lost subscriber data has been rebuilt, and performs processing to change the registration state of the relevant subscriber to "COMPLETE" (flag clearing) (S 714). When the registration state of the subscriber is changed to "COMPLETE", the S-CSCF (3) performs INVITE reception processing according to existing procedures (S 715).

According to the fifth embodiment, configuration is such that every time the S-CSCF (3) receives a SIP INVITE reception request signal, the AS (4) restores the subscriber data of a SIP terminal from which the reception request is received. This prevents a high volume of SIP REGISTER signals from being exchanged in a short period of time, and hence the temporary increase in the network load can be avoided.

A sixth embodiment of the present invention will be described using FIG. 8.

Figure 8:
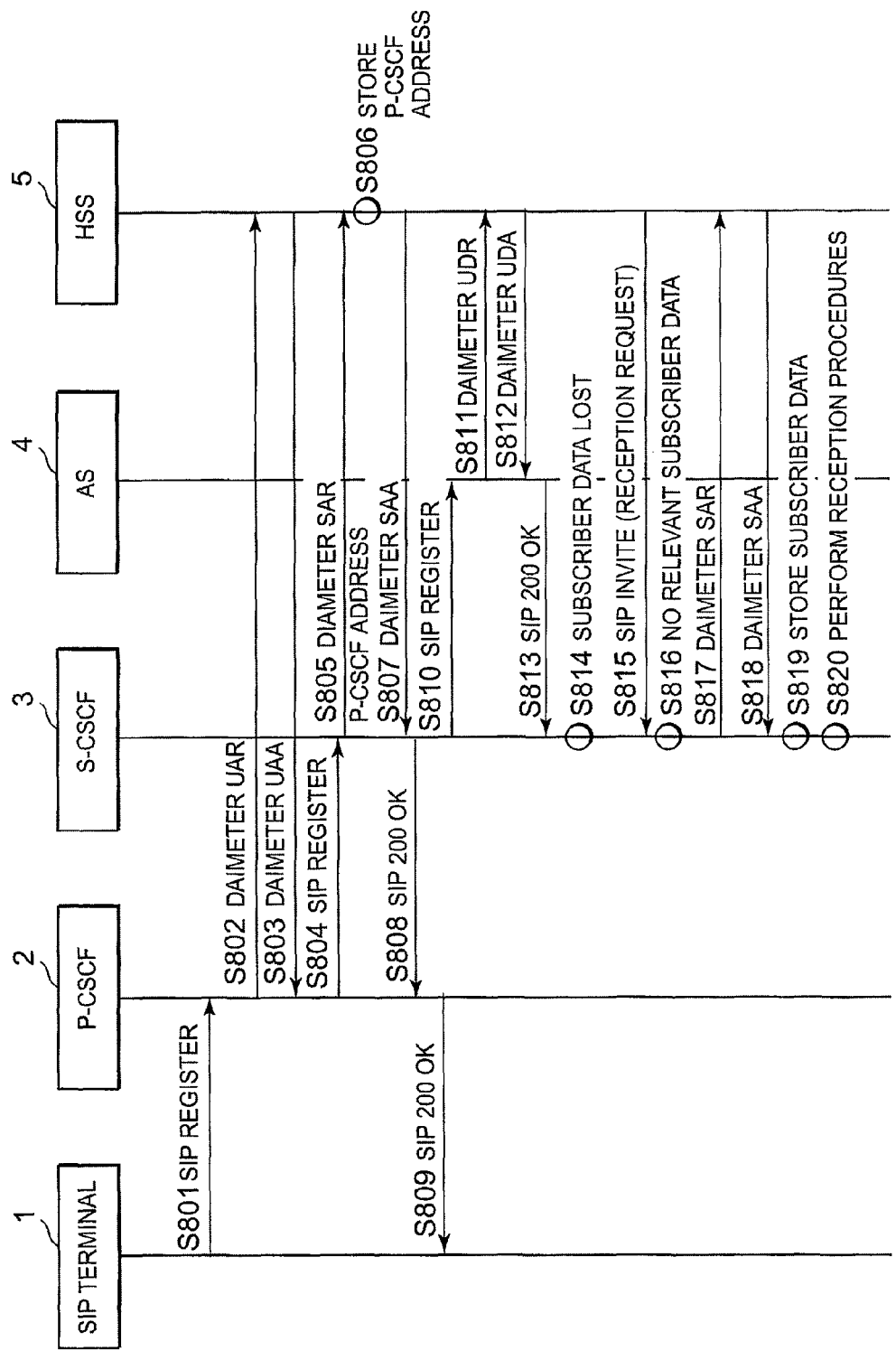
FIG. 8, showing a sixth embodiment of the present invention, is an explanatory diagram of procedures for restoring subscriber data when a S-CSCF has lost subscriber data, the procedures being triggered by reception by the user.

FIG. 8 showing the sixth embodiment of the present invention is an explanatory diagram of procedures for restoration of subscriber data to be performed by being triggered by reception by the user when the S-CSCF has lost subscriber data.

In the subscriber data restoring procedures triggered by a reception INVITE when subscriber data is lost in the S-CSCF, the HSS manages only the registered S-CSCF address whereas it does not manage the P-CSCF address. Therefore, the S-CSCF is unable to activate the P-CSCF by means of the reception INVITE. Accordingly, the subscriber data restoring procedures described in FIGS. 5 to 7 (the third to fifth embodiments) are not sufficient.

This sixth embodiment, therefore, has an additional step of transmitting P-CSCF address information acquired by the S-CSCF to the HSS when the SIP terminal (1) performs SIP registration (user registration) to register the same in the HSS so that the P-CSCF address information is utilized in the subscriber data restoring procedures in the S-CSCF (3). Operation of the sixth embodiment will be described with reference to FIG. 8.

When the SIP terminal (1) transmits a SIP REGISTER signal to the P-CSCF (2) for SIP registration (user registration) (S 801), the P-CSCF (2) receiving this SIP REGISTER signal performs existing procedures (S 802) to (S 803) to acquire from the HSS (5) address information of the S-CSCF (3) to which the registration is to be made, and transmits a SIP REGISTER signal to the S-CSCF (3) (S 804).

Receiving the SIP REGISTER signal from the P-CSCF (2), the S-CSCF (3) transmits a Diameter SAR signal to the HSS (5) in order to request subscriber data, while at the same time setting, on the Diameter SAR signal, address information of the P-CSCF (2) to be used in the subscriber data restoring procedures in the S-CSCF (3) (S 805). Upon receiving the Diameter SAR signal having the address information of the P-CSCF (2) set thereon, the HSS (5) stores the address information of the P-CSCF (2) as subscriber data (S 806) and transmits a Diameter SAA signal containing the subscriber data to the S-CSCF (3) (S 807).

Receiving the Diameter SAA signal, the S-CSCF (3) stores the received subscriber data and transmits to the P-CSCF (2) a SIP 200 OK signal indicating that the SIP registration has been successfully done (S 808). Receiving the SIP 200 OK signal, the P-CSCF (2) transmits the SIP 200 OK signal to the SIP terminal (1) (S 809). The S-CSCF (3) performs existing procedures (S 810) to (S 813) as procedures for constructing subscriber data of the AS (4). This completes the SIP registration procedures from the SIP terminal (1).

In this SIP registration state, when the S-CSCF (3) receives SIP INVITE reception request to a subscriber whose subscriber data has been lost by the S-CSCF (3) (S 815) in a state in which the S-CSCF (3) has lost the subscriber data due to a reason such as node restart (S 814), the S-CSCF (3) searches the subscriber data for the purpose of performing reception processing for the relevant subscriber, and recognizes that the subscriber data of the subscriber does not exist since the subscriber data has been lost (S 816).

Recognizing that the subscriber data does not exist, the S-CSCF (3) transmits a Diameter SAR signal to the HSS (5) in order to acquire the subscriber data (S 817). The Diameter SAR signal in the step (S 817) does not contain address information of the P-CSCF (2) since the S-CSCF (3) does not hold the information of the P-CSCF (2).

Receiving the Diameter SAR signal not containing address information of the P-CSCF (2), the HSS (5) recognizes that the signal is a request for acquiring the subscriber data by subscriber data restoration, and transmits to the S-CSCF (3) the Diameter SAA signal having the address information of the P-CSCF (2) stored in the step (S 806) set thereon (S 818). Receiving the Diameter SAA signal, the S-CSCF (3) completes the subscriber data restoration by storing the received subscriber data and the address information of the P-CSCF (2) (S 819). Completing the subscriber data restoring procedures, the S-CSCF (3) performs the reception processing by transmitting to the P-CSCF (3) a reception INVITE signal according to existing procedures (S 820).

According to the sixth embodiment, even if the S-CSCF has lost the P-CSCF address to which a reception INVITE is to be transmitted, the S-CSCF is capable of downloading the P-CSCF address from the AS (4) or requesting transmission of the P-CSCF address by broadcasting to the AS (4).

This means that the present invention is characterized in that, when subscriber data has been lost by a S-CSCF or AS in an IMS network due to node restart or the like, a node having lost the subscriber data notifies an neighboring node of that effect, and the neighboring node receiving the notification starts control for rebuilding the subscriber data in the node having lost the subscriber data, whereby the lost subscriber data can be restored without requiring the user to perform re-registration operation by turning the power ON/OFF.

More specifically, the present invention provides an IMS network having a P-CSCF connected to a SIP terminal as a subscriber terminal via an access network; a S-CSCF located within a service provision area of a provider which the SIP terminal subscribes to; and a HSS storing user subscription information, characterized in that the S-CSCF has a function to transmit a SIP RESET signal to the P-CSCF neighboring thereto when losing subscriber data acquired by registration processing, a function to receive a SIP REGISTER signal transmitted by the P-CSCF in response to the SIP RESET signal, and a function to restore the lost subscriber data from the HSS by performing re-registration processing according to the received SIP REGISTER signal.

Further, configuration may be such that the P-CSCF has a function to search registration information in the P-CSCF for subscribers who are registered to the S-CSCF when receiving the SIP RESET signal, a function to perform flag control on the registration information of a relevant subscriber in order to identify that the subscriber data has been lost in the S-CSCF, a function to transmit to the S-CSCF a SIP REGISTER signal of the relevant subscriber, and a function to clear the flag control upon receiving a response signal from the S-CSCF in response to the SIP REGISTER signal transmitted thereto.

Alternatively, the P-CSCF may have a function to search registration information of the P-CSCF for subscribers who are registered to the S-CSCF when receiving the SIP RESET signal, a function to perform flag control on the registration information of a relevant subscriber to identify that the subscriber data has been lost in the S-CSCF, a function to transmit a SIP REGISTER signal of the relevant subscriber to the S-CSCF when receiving a SIP INVITE transmission request from the SIP terminal on which the flag control is performed, and a function to clear the flag control upon receiving a response signal from the S-CSCF in response to the SIP REGISTER signal transmitted thereto and then perform transmission procedure in response to the SIP INVITE transmission request.

Further, the present invention may be configured such that, in an IMS network having a P-CSCF connected to a SIP terminal as a subscriber terminal via an access network; a S-CSCF located within a service provision area of a provider which the SIP terminal subscribes to; and a HSS storing user subscription information, the S-CSCF has a function to transmit a Diameter SAR signal to be transmitted to the HSS when performing registration processing, while setting thereon address information of the P-CSCF having transmitted a SIP REGISTER signal, a function to transmit to the HSS a Diameter SAR signal not containing address information of the P-CSCF when receiving a SIP INVITE reception request when the subscriber data acquired by the registration processing has been lost, a function to receive a Diameter SAA signal having address information of the P-CSCF set thereon transmitted by the HSS in response to the Diameter SAR signal not containing the address information of the P-CSCF, a function to restore the lost subscriber data and the P-CSCF address information by performing re-registration processing according to the received Diameter SAA signal, and a function to perform reception processing requested by the SIP INVITE reception request according to the restored subscriber data.

In this case, the HSS is configured to have a function to transmit, when receiving a Diameter SAR signal not containing the P-CSCF address information from the S-CSCF, a Diameter SAA signal having the P-CSCF address information stored during the registration processing to the S-CSCF.

The IMS network according to the present invention may be further provided with an AS activated by the S-CSCF according to the subscription state of each user to perform respective application services, the AS having a function to transmit a SIP RESET signal to the S-CSCF when the subscriber data acquired during the registration processing is lost, a function to receive a SIP REGISTER signal transmitted by the S-CSCF in response to the SIP RESET signal, and a function to restore the lost subscriber data from the HSS by performing re-registration processing according to the received SIP REGISTER signal.

A subscriber data restoring method in an IMS network according to the present invention is characterized in that the S-CSCF transmits a SIP RESET signal to the P-CSCF neighboring thereto when having lost subscriber data acquired by registration processing, receives a SIP REGISTER signal transmitted by the P-CSCF in response to the SIP RESET signal, and performs re-registration processing according to the received SIP REGISTER signal to restore the lost subscriber data from the HSS.

Further, the subscriber data restoring method is characterized in that the AS transmits a SIP RESET signal to the S-CSCF when having lost subscriber data acquired by the registration processing, receives a SIP REGISTER signal transmitted by the S-CSCF in response to the SIP RESET signal, and performs re-registration processing according to the received SIP REGISTER signal to restore the lost subscriber data from the HSS.

Specifically, according to the present invention, it is firstly notified to a neighboring node by means of a SIP RESET signal that an IMS node (S-CSCF or AS) having subscriber data has lost the subscriber data due to a reason such as restart or the like. This enables the neighboring node to recognize that it is unable to provide transmission/reception service of a subscriber related to it self. The neighboring node thus performs registration procedures for the subscribers whose subscriber data has been lost. The IMS node having the subscriber data is thus enabled to rebuild the lost subscriber data immediately upon detecting that the subscriber data has been lost, and to provide similar transmission/reception services to those before losing the subscriber data.

Although the present invention has been described based on the embodiments above, the present invention is not limited to these embodiments. For example, although the data restoring method according to the about-mention embodiment to have been restricted to the IMS network, the data restoring method of the present invention will be apprise to any about network which is similar in operation to the IMS network. Configuration and particulars of the present invention may be changed variously as conceivable by those skilled in the art without departing from the scope of the claims of the present invention.

This application is based upon and claims the benefit of priority from Japanese Patent Application No. 2007-096810, filed Apr. 2, 2007, the disclosure of which is incorporated herein in its entirety by reference.

The invention claimed is:

1. A subscriber data restoring type IMS (IP Multimedia subsystem) network system comprising:
 a P-CSCF (Proxy Call Session Control Function) connected to a SIP (Session Initiation Protocol) terminal as a subscriber terminal via an access network;
 a S-CSCF (Serving Call Session Control Function) located within a service provision area of a provider to which the SIP terminal subscribes; and
 a HSS (Home Subscriber Server) storing user subscription information,
 wherein the S-CSCF has the functions of:
 transmitting a SIP RESET signal to the P-CSCF neighboring thereto when losing subscriber data acquired by registration processing;
 receiving a SIP REGISTER signal transmitted by the P-CSCF in response to the SIP RESET signal; and
 performing re-registration processing according to the received SIP REGISTER signal to restore the lost subscriber data from the HSS.

2. The subscriber data restoring type IMS network system according to claim 1, wherein the P-CSCF has the functions of:
 searching registration information of the P-CSCF for a subscriber who is registered to the S-CSCF when receiving the SIP RESET signal;
 performing flag control on the registration information of a relevant subscriber to identify that the subscriber data has been lost in the S-CSCF;
 transmitting a SIP REGISTER signal of the relevant subscriber to the S-CSCF; and
 clearing the flag control upon receiving a response signal transmitted by the S-CSCF in response to the transmitted SIP REGISTER signal.

3. The subscriber data restoring type IMS network system according to claim 1, wherein the P-CSCF has the functions of:
    searching registration information of the P-CSCF for a subscriber who is registered to the S-CSCF when receiving the SIP RESET signal;
    performing flag control on registration information of a relevant subscriber to identify that the subscriber data has been lost in the S-CSCF;
    transmitting, when receiving a SIP INVITE transmission request from a SIP terminal on which the flag control is performed, a SIP REGISTER signal of the subscriber relevant to the SIP terminal to the S-CSCF; and
    clearing the flag control upon receiving a response signal transmitted by the S-CSCF in response to the transmitted SIP REGISTER signal, and then performing transmission procedures requested by the SIP INVITE transmission request.

4. A subscriber data restoring type IMS network system comprising:
    a P-CSCF (Proxy Call Session Control Function) connected to a SIP (Session Initiation Protocol) terminal as a subscriber terminal via an access network;
    a S-CSCF (Serving Call Session Control Function) located within a service provision area of a provider to which the SIP terminal subscribes; and
    a HSS (Home Subscriber Server) storing user subscription information,
    wherein the S-CSCF has the functions of:
    transmitting a Diameter SAR signal to be transmitted to the HSS when performing registration processing, while setting thereon address information of the P-CSCF having transmitted a SIP REGISTER signal;
    transmitting to the HSS a Diameter SAR signal not containing the address information of the P-CSCF when receiving a SIP INVITE reception request when the subscriber data acquired by the registration processing has been lost;
    receiving a Diameter SAA signal having the P-CSCF address information set thereon which is transmitted by the HSS in response to the Diameter SAR signal not containing the P-CSCF address information;
    performing re-registration processing according to the received Diameter SAA signal to restore the lost subscriber data and the P-CSCF address information; and
    performing reception processing requested by the SIP INVITE reception request according to the restored subscriber data.

5. The subscriber data restoring type IMS network system according to claim 4, wherein the HSS has a function of transmitting, when receiving a Diameter SAR signal not containing P-CSCF address information from the S-CSCF, a Diameter SAA signal on which P-CSCF address information stored during the registration processing is set to the S-CSCF.

6. The subscriber data restoring type IMS network system according to claim 5, wherein the IMS network system comprises an AS (Application Server) activated by the S-CSCF according to a registration state of each user to perform respective application services, and the AS has the functions of:
    transmitting a SIP RESET signal to the S-CSCF when losing subscriber data acquired by the registration processing;
    receiving a SIP REGISTER signal transmitted by the S-CSCF in response to the SIP RESET signal; and
    performing re-registration processing according to the received SIP REGISTER signal to restore the lost subscriber data from the HSS.

7. The subscriber data restoring type IMS network system according to claim 6, wherein the S-CSCF has the functions of:
    searching registration information in the S-CSCF for subscribers who are registered to the AS when receiving the SIP RESET signal;
    performing flag control on the registration information of a relevant subscriber to identify that the subscriber data has been lost in the AS;
    transmitting a SIP REGISTER signal of the relevant subscriber to the AS; and
    clearing the flag control upon receiving a response signal transmitted by the AS in response the transmitted SIP REGISTER signal.

8. The subscriber data restoring type IMS network system according to according to claim 6, wherein the S-CSCF has the functions of:
    searching registration information in the S-CSCF for subscribers who are registered to the AS when receiving the SIP RESET signal;
    performing flag control on registration information of a relevant subscriber to identify that the subscriber data has been lost in the AS;
    transmitting, upon receiving a SIP INVITE transmission request from a SIP terminal on which the flag control is performed, a SIP REGISTER signal of the subscriber relevant to the SIP terminal to the AS;
    clearing the flag control upon receiving the response signal transmitted by the AS in response to the transmitted SIP REGISTER signal, and then performing transmission procedures requested by the SIP INVITE transmission request.

9. The subscriber data restoring type IMS network system according to according to claim 6, wherein the S-CSCF has the functions of:
    searching registration information in the S-CSCF for subscribers who are registered to the AS when receiving the SIP RESET signal;
    performing flag control on registration information of a relevant subscriber to identify that the subscriber data has been lost in the AS;
    transmitting, upon receiving a SIP INVITE reception request from a SIP terminal on which the flag control is performed, a SIP REGISTER signal of the subscriber relevant to the SIP terminal to the AS; and
    clearing the flag control upon receiving a response signal transmitted by the AS in response to the transmitted SIP REGISTER signal, and then performing reception procedures requested by the SIP INVITE reception request.

10. The subscriber data restoring type IMS network system according to claim 4, wherein the IMS network system comprises an AS (Application Server) activated by the S-CSCF according to a registration state of each user to perform respective application services, and the AS has the functions of:
    transmitting a SIP RESET signal to the S-CSCF when losing subscriber data acquired by the registration processing;
    receiving a SIP REGISTER signal transmitted by the S-CSCF in response to the SIP RESET signal; and
    performing re-registration processing according to the received SIP REGISTER signal to restore the lost subscriber data from the HSS.

11. The subscriber data restoring type IMS network system according to claim 10, wherein the S-CSCF has the functions of:
   searching registration information in the S-CSCF for subscribers who are registered to the AS when receiving the SIP RESET signal;
   performing flag control on the registration information of a relevant subscriber to identify that the subscriber data has been lost in the AS;
   transmitting a SIP REGISTER signal of the relevant subscriber to the AS; and
   clearing the flag control upon receiving a response signal transmitted by the AS in response the transmitted SIP REGISTER signal.

12. The subscriber data restoring type IMS network system according to according to claim 10, wherein the S-CSCF has the functions of:
   searching registration information in the S-CSCF for subscribers who are registered to the AS when receiving the SIP RESET signal;
   performing flag control on registration information of a relevant subscriber to identify that the subscriber data has been lost in the AS;
   transmitting, upon receiving a SIP INVITE transmission request from a SIP terminal on which the flag control is performed, a SIP REGISTER signal of the subscriber relevant to the SIP terminal to the AS;
   clearing the flag control upon receiving the response signal transmitted by the AS in response to the transmitted SIP REGISTER signal, and then performing transmission procedures requested by the SIP INVITE transmission request.

13. The subscriber data restoring type IMS network system according to according to claim 10, wherein the S-CSCF has the functions of:
   searching registration information in the S-CSCF for subscribers who are registered to the AS when receiving the SIP RESET signal;
   performing flag control on registration information of a relevant subscriber to identify that the subscriber data has been lost in the AS;
   transmitting, upon receiving a SIP INVITE reception request from a SIP terminal on which the flag control is performed, a SIP REGISTER signal of the subscriber relevant to the SIP terminal to the AS; and
   clearing the flag control upon receiving a response signal transmitted by the AS in response to the transmitted SIP REGISTER signal, and then performing reception procedures requested by the SIP INVITE reception request.

14. A subscriber data restoring method in a network system comprising a SIP terminal as a subscriber terminal, a P-CSCF to which the SIP terminal directly accesses, a S-CSCF located in a service provision area of a provider to which the SIP terminal directly subscribes, an AS activated by the S-CSCF according a registration state of each user to perform processing of respective application services, and a HSS storing user subscription information,
   the method being characterized in that the S-CSCF transmits a SIP RESET signal to the P-CSCF neighboring thereto when losing subscriber data acquired by registration processing, receives a SIP REGISTER signal transmitted by the P-CSCF in response to the SIP RESET signal, and performs re-registration processing according to the received SIP REGISTER signal to restore the lost subscriber data from the HSS.

15. The subscriber data restoring method in the network system according to claim 14, characterized in that the P-CSCF searches registration information in the P-CSCF for subscribers who are registered to the S-CSCF when receiving the SIP RESET signal, performs flag control on registration information of a relevant subscriber to identify that the subscriber data has been lost in the S-CSCF while transmitting a SIP REGISTER signal of the relevant subscriber to the S-CSCF, and clears the flag control upon receiving a response signal transmitted by the S-CSCF in response to the transmitted SIP REGISTER signal.

16. The subscriber data restoring method in the network system according to claim 14, characterized in that the P-CSCF searches registration information in the P-CSCF for subscribers who have been registered to the S-CSCF when receiving the SIP RESET signal, performs flag control on registration information of a relevant subscriber to identify that the subscriber data has been lost in the S-CSCF while transmitting, when receiving a SIP INVITE transmission request from a SIP terminal on which the flag control is performed, a SIP REGISTER signal of the subscriber relevant to the SIP terminal to the S-CSCF, clears the flag control upon receiving a response signal transmitted by the S-CSCF in response to the transmitted SIP REGISTER signal, and then performs reception procedures requested by the SIP INVITE transmission request.

17. The subscriber data restoring method in the network system according to claim 14, characterized in that the S-CSCF transmits a Diameter SAR signal to be transmitted to the HSS when performing registration processing while setting thereon address information of the P-CSCF having transmitted a SIP REGISTER signal, transmits a Diameter SAR signal not containing the address information of the P-CSCF to the HSS when receiving a SIP INVITE reception request when subscriber data acquired by the registration processing is lost, receives a Diameter SAA signal having the P-CSCF address information set thereon transmitted by the HSS in response to the Diameter SAR signal not containing the P-CSCF address information, and performs re-registration processing according to the received Diameter SAA signal to restore the lost subscriber data and the P-CSCF address information.

18. The subscriber data restoring method in the network system according to claim 17, characterized in that the HSS transmits, when receiving a Diameter SAR signal not containing the address information of the P-CSCF from the S-CSCF, a Diameter SAA signal on which the P-CSCF address information stored during the registration processing is set to the S-CSCF.

19. The subscriber data restoring method in the network system according to claim 14, characterized in that the AS transmits a SIP RESET signal to the S-CSCF when losing subscriber data acquired by the registration processing, receives a SIP REGISTER signal transmitted by the S-CSCF in response to the SIP RESET signal, and performs re-registration processing according to the received SIP REGISTER signal to restore the lost subscriber data from the HSS.

20. The subscriber data restoring method in the network system according to claim 19, characterized in that the S-CSCF searches registration information in the S-CSCF for subscribers who are registered to the AS when receiving the SIP RESET signal, performs flag control on registration information of a relevant subscriber to identify that the subscriber data has been lost in the AS, transmits a SIP REGISTER signal of the relevant subscriber to the AS, and clears the flag control upon receiving a response signal transmitted by the AS in response to the transmitted SIP REGISTER signal.

* * * * *